US00RE43996E

(19) United States
(12) Reissued Patent
Huang

(10) Patent Number: US RE43,996 E
(45) Date of Reissued Patent: Feb. 19, 2013

(54) TELEPHONE

(75) Inventor: Cheng-Ai Huang, Taipei (TW)
(73) Assignee: Pchome Online, Inc., Taipei (TW)

(21) Appl. No.: 29/324,079
(22) Filed: Sep. 5, 2008

Related U.S. Patent Documents

Reissue of:
(64) Patent No.: Des. 527,720
Issued: Sep. 5, 2006
Appl. No.: 29/236,782
Filed: Aug. 23, 2005
(51) LOC (9) Cl. ..... 14-03
(52) U.S. Cl. ..... D14/147
(58) Field of Classification Search ..... D14/137–138 R, D14/138 C–138 G, 144, 147–150, 156, 192, D14/218, 247–248, 250, 341–347; D21/329, D21/331, 333, 517; 348/14.01–14.02; 361/814; 379/428.01–428.02, 433.01–433.13, 434, 379/451–452; 455/556.1–556.2, 566, 575.1, 455/575.3, 575.4; D13/168; D26/32, 37–38, D26/47, 51, 57, 94, 97
See application file for complete search history.

(56) References Cited

U.S. PATENT DOCUMENTS

| | | | | |
|---|---|---|---|---|
| 3,659,050 | A | | 4/1972 | Carlson et al. |
| D261,761 | S | | 11/1981 | Ingber et al. |
| D262,207 | S | | 12/1981 | Kaczkos |
| D266,758 | S | | 11/1982 | Johannsen et al. |
| D271,201 | S | | 11/1983 | Nordberg |
| D282,739 | S | | 2/1986 | Salovaara |
| D283,126 | S | | 3/1986 | Marshall |
| D283,709 | S | | 5/1986 | Williams et al. |
| D285,199 | S | | 8/1986 | Hocking et al. |
| D301,037 | S | | 5/1989 | Matsuda |
| D303,658 | S | | 9/1989 | Spira et al. |
| D309,302 | S | | 7/1990 | Dickson |
| D310,219 | S | | 8/1990 | Carlile |
| D322,610 | S | | 12/1991 | Auerbach et al. |
| D323,655 | S | | 2/1992 | Bethea et al. |
| D326,449 | S | | 5/1992 | Wachob et al. |
| D340,034 | S | | 10/1993 | Hofstetter et al. |
| D345,355 | S | | 3/1994 | Konno et al. |
| D345,548 | S | | 3/1994 | Giebler et al. |
| D357,018 | S | | 4/1995 | Takami |
| D383,130 | S | | 9/1997 | Waldner |
| D407,703 | S | | 4/1999 | Stokes |
| D413,328 | S | | 8/1999 | Kazama |
| D419,552 | S | | 1/2000 | Passman et al. |
| D430,130 | S | | 8/2000 | Lytel |
| D450,662 | S | | 11/2001 | Kwok |
| D451,603 | S | | 12/2001 | Bastyr et al. |
| D485,826 | S | | 1/2004 | Goto |
| D486,483 | S | | 2/2004 | Bloomberg et al. |
| D488,830 | S | | 4/2004 | Joachim |
| D496,003 | S | | 9/2004 | Spira |
| D513,035 | S | | 12/2005 | Lui |
| D526,639 | S | * | 8/2006 | Huang ..... D14/147 |
| D539,777 | S | * | 4/2007 | Pena Angarita ..... D14/138 R |
| D559,828 | S | * | 1/2008 | Iwai ..... D14/147 |
| D576,145 | S | * | 9/2008 | Huang ..... D14/147 |
| D589,928 | S | * | 4/2009 | Haspil et al. ..... D14/147 |
| D597,059 | S | * | 7/2009 | Haspil et al. ..... D14/147 |
| D601,136 | S | * | 9/2009 | Miles et al. ..... D14/247 |

* cited by examiner

*Primary Examiner* — Robert M Spear
(74) *Attorney, Agent, or Firm* — Bacon & Thomas, PLLC

(57) CLAIM

The ornamental design for a telephone, as shown and described.

DESCRIPTION

[FIG. 1 is a perspective view of a telephone in accordance with my design;]
[FIG. 2 is a front view thereof;]
[FIG. 3 is a rear view thereof;]
[FIG. 4 is a left view thereof;]
[FIG. 5 is a right view thereof;]
[FIG. 6 is a top view thereof; and,]
[FIG. 7 is a bottom view thereof.]
*FIG. 8 is a perspective view of a telephone in accordance with my design;*
*FIG. 9 is a front view thereof;*
*FIG. 10 is a rear view thereof;*
*FIG. 11 is a left view thereof;*
*FIG. 12 is a right view thereof;*
*FIG. 13 is a top view thereof; and,*
*FIG. 14 is a bottom view thereof.*
*The broken lines in the drawings represent unclaimed environmental subject matter.*

1 Claim, 3 Drawing Sheets

Matter enclosed in heavy brackets [ ] appears in the original patent but forms no part of this reissue; matter printed in italics indicates the additions made by reissue.

NEW SHEET
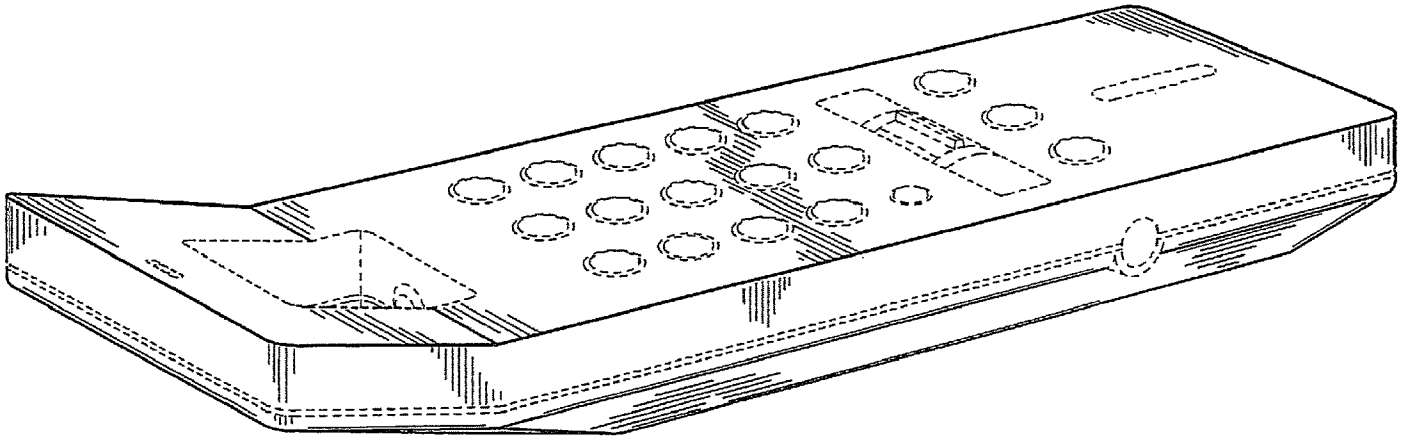
Fig. 8 (NEW)

NEW SHEET
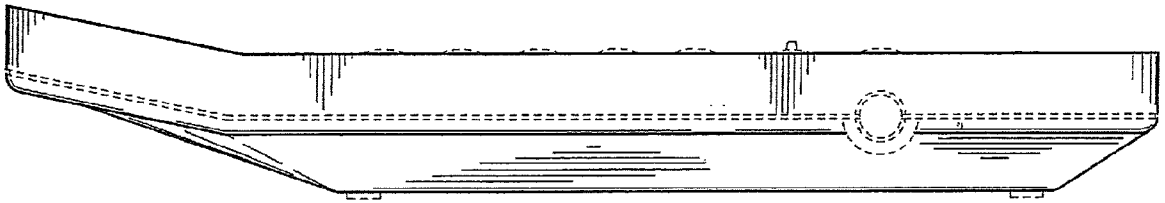
Fig. 9 (NEW)
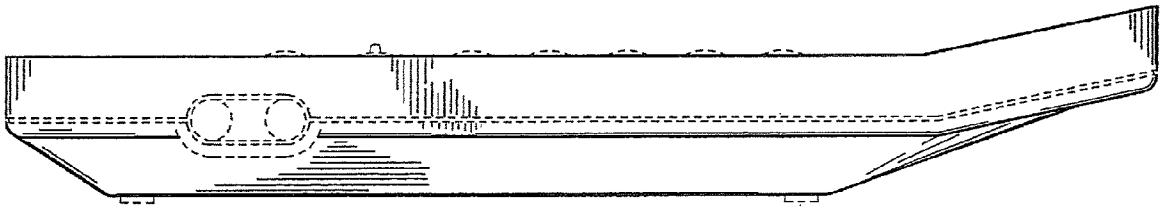
Fig. 10 (NEW)
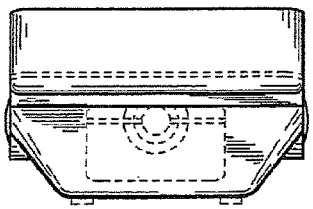
Fig. 11 (NEW)
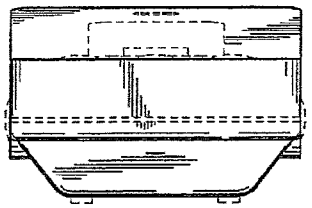
Fig. 12 (NEW)

NEW SHEET
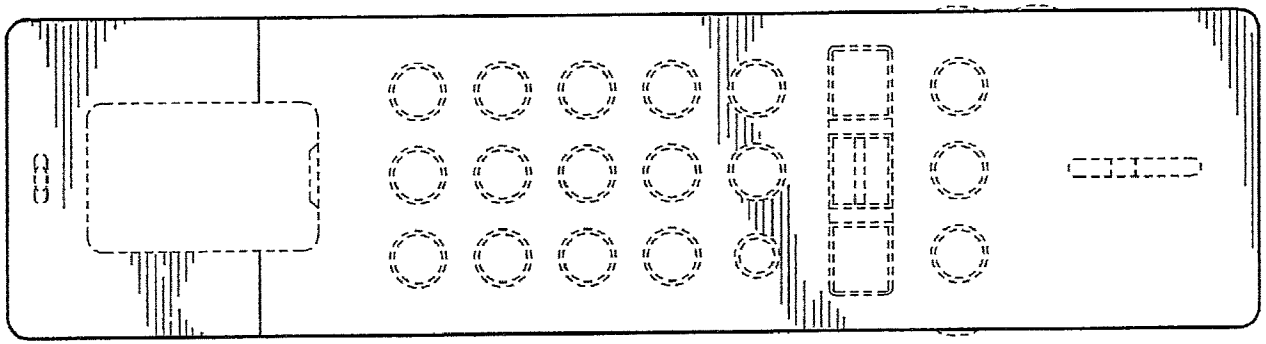
Fig. 13 (NEW)
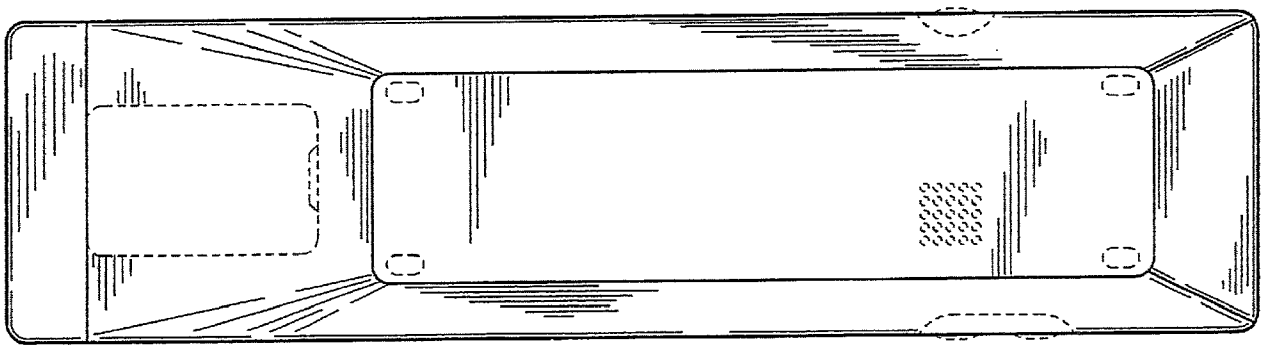
Fig. 14 (NEW)